United States Patent
Netsu (10) Patent No.: US 10,506,127 B2
(45) Date of Patent: Dec. 10, 2019

(54) SCANNER INCLUDING FIRST SENSOR TO READ FIRST DOCUMENT WHEN PLACED ON PLATEN GLASS AND SECOND AND THIRD SENSORS TO READ SECOND DOCUMENT WHEN MOVING ALONG CONVEYANCE PATH, AND SCANNER DATA GENERATING METHOD

(71) Applicant: SEIKO EPSON CORPORATION, Tokyo (JP)

(72) Inventor: Takahiro Netsu, Nagano (JP)

(73) Assignee: Seiko Epson Corporation, Tokyo (JP)

(*) Notice: Subject to any disclaimer, the term of this patent is extended or adjusted under 35 U.S.C. 154(b) by 0 days.

(21) Appl. No.: 15/976,952

(22) Filed: May 11, 2018

(65) Prior Publication Data

US 2018/0352109 A1    Dec. 6, 2018

(30) Foreign Application Priority Data

May 30, 2017  (JP) ................................ 2017-106279
Dec. 14, 2017  (JP) ................................ 2017-239345

(51) Int. Cl.
| | | |
|---|---|---|
| *H04N 1/04* | (2006.01) | |
| *H04N 1/203* | (2006.01) | |
| *H04N 1/10* | (2006.01) | |
| *H04N 1/028* | (2006.01) | |
| *H04N 1/12* | (2006.01) | |

(52) U.S. Cl.
CPC ....... *H04N 1/2032* (2013.01); *H04N 1/02865* (2013.01); *H04N 1/1061* (2013.01); *H04N 1/1235* (2013.01)

(58) Field of Classification Search
CPC ............ H04N 1/2032; H04N 1/02865; H04N 1/1061; H04N 1/1235
USPC .................................................. 358/497, 1.1
See application file for complete search history.

(56) References Cited

U.S. PATENT DOCUMENTS

| | | | |
|---|---|---|---|
| 8,345,325 B2 | 1/2013 | Schmidt et al. | |
| 2013/0003145 A1* | 1/2013 | Osakabe | H04N 1/203 358/497 |
| 2015/0210491 A1* | 7/2015 | Naniwa | B65H 5/36 358/498 |
| 2016/0303864 A1 | 10/2016 | Ando et al. | |
| 2017/0334212 A1 | 11/2017 | Ando et al. | |

FOREIGN PATENT DOCUMENTS

| | | |
|---|---|---|
| EP | 2091223 A1 | 8/2009 |
| JP | 4864021 B2 | 1/2012 |
| JP | 2016-205171 A | 12/2016 |

* cited by examiner

*Primary Examiner* — Douglas Q Tran
(74) *Attorney, Agent, or Firm* — Global IP Counselors, LLP (57) ABSTRACT

Provided is a more desirable product. A scanner has a first sensor configured to read a document on a platen glass; a second sensor configured to read a first side of a moving document; and a third sensor configured to read a second side, which is the opposite side as the first side, of a moving document. The first sensor forms a reduced size image of the document; and the second sensor and third sensor image form a same-size image of light from the document.

6 Claims, 7 Drawing Sheets

SCANNER INCLUDING FIRST SENSOR TO READ FIRST DOCUMENT WHEN PLACED ON PLATEN GLASS AND SECOND AND THIRD SENSORS TO READ SECOND DOCUMENT WHEN MOVING ALONG CONVEYANCE PATH, AND SCANNER DATA GENERATING METHOD

BACKGROUND

1. Technical Field

The present invention relates to a scanner and method of generating scanning data.

2. Related Art

There are many types of scanning methods that scanners can use. JP-A-2013-131794, for example, describes a method of using a monocular lens to form a reduced size image of an entire image in the main scanning direction on an imaging element, and a method of using a compound eye optical system that splits an image of the main scanning direction into multiple parts which are then reconstructed.

The specifications of parts configuring the product are not clear in the technology cited above.

SUMMARY

An objective of the present invention is to provide a more desirable product.

To achieve the foregoing objective, a scanner according to the invention has a first sensor configured to read a document on a platen glass; a second sensor configured to read a first side of a moving document; and a third sensor configured to read a second side, which is the opposite side as the first side, of a moving document.

More specifically, a document placed on the platen glass, and a document that is conveyed, are read by different sensors. With this configuration there is no need to configure a single sensor meeting all of the performance requirements necessary to scan documents under different scanning conditions, allows for providing individual sensors meeting the performance requirements of different modes, enables absorbing the cost increase resulting from increasing the number of sensors, and suppresses the total cost.

More particularly, if the first sensor forms a reduced size image of the document, and the second sensor and third sensor each form same-size images of light from a document, it is easier to provide a first sensor requiring depth of field, and a second sensor and third sensor requiring high speed reading, and cost can be suppressed.

In another aspect of the invention, the first sensor may be configured to image light from a same part of the document on different sensor chips.

This configuration enables absorbing the cost increase resulting from increasing the number of sensors, and suppressing the total cost, of a configuration that generates scanning data of a main scanning direction by combining the read results from different sensor chips.

In another aspect of the invention, the second sensor and the third sensor may be configured to read a document exposed to more intense light than the first sensor.

More specifically, the need for high speed is not great when reading a document on a platen glass. Therefore, because the first sensor can scan at a relatively slow scanning speed using relatively weak light, the need for means of dissipating heat from the light source of the first sensor is eliminated, increasing module size can be prevented, and cost can be suppressed.

In another aspect of the invention, output of the first sensor, and output of the second sensor, are image converted by the same conversion circuit.

More specifically, because the first sensor and second sensor are not used simultaneously, there is no problem with a configuration that image processes the outputs of both sensors by the same conversion circuit. Therefore, this configuration can reduce cost compared with a configuration having a separate conversion circuit for each sensor.

Other objects and attainments together with a fuller understanding of the invention will become apparent and appreciated by referring to the following description and claims taken in conjunction with the accompanying drawings.

DESCRIPTION OF EMBODIMENTS

A preferred embodiment of the present invention is described below with reference to the accompanying figures.

Preferred embodiments of the present invention are described below with reference to the accompanying figures.

Embodiment 1

A preferred embodiment of the present invention is described below in the following order: (1) scanner configuration, (2) optical system configuration, (3) scanning process, (4) other embodiments.

(1) Scanner Configuration

Figure 1:
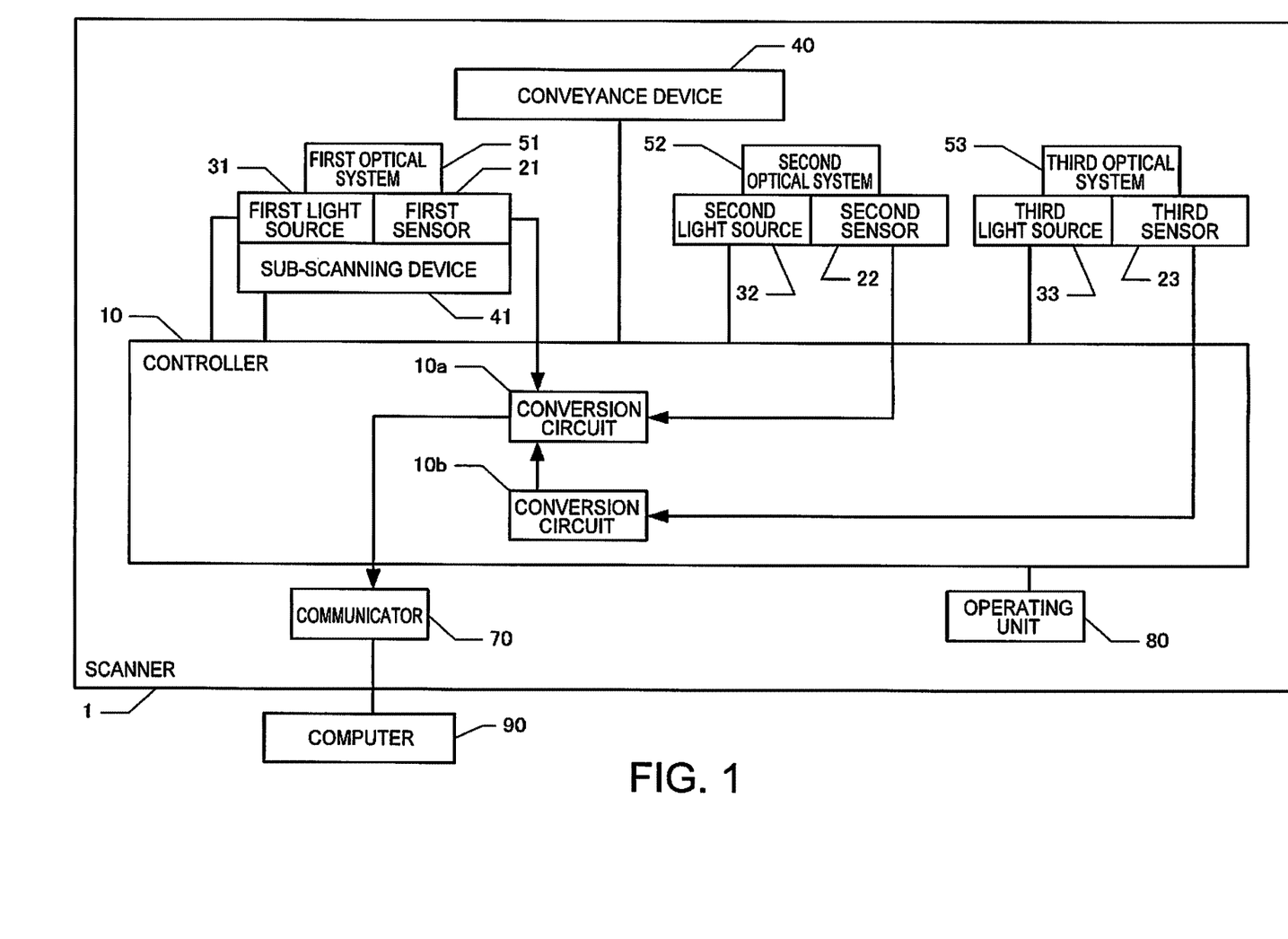
FIG. 1 is a block diagram of a scanner.

FIG. 1 is a block diagram of a scanner 1 according to this embodiment of the invention. The scanner 1 includes a controller 10, conveyance device 40, communicator 70, operating unit 80, computer 90, and a 3-channel reading unit (including light sources, sensors, and optical units).

The controller 10 includes a recording medium and a control unit not shown, and a SOC (system on a chip) configuring conversion circuits 10*a*, 10*b*. Note that the controller 10 can be embodied by many configurations having a processor, including configurations having a dedicated circuit device such as an ASIC embodied by circuits executing a specific process, or a CPU that reads and executes a program from a recording medium, or a SOC. The processor may also be embodied by a SOC or ASIC working with a CPU.

The controller 10 controls parts of the scanner 1, converts the output of reading units by the conversion circuits 10*a*, 10*b*, and generates scanning data. An operating unit 80 includes an output unit that provides information to the user, and an input unit for receiving input from the user. The controller 10 controls the operating unit 80 to display on the output unit information for selecting scanning conditions and instructing scanning, for example. Based on output from the output unit, the user can select scanning conditions and input start-scanning commands.

When a start-scanning command is input, the controller 10 controls parts of the scanner 1 to execute the operations for scanning a document (such as conveying the document). When read data is output from the reading unit by this operation, the conversion circuit 10*a* (and conversion circuit 10*b* when duplex scanning is selected) applies image conversion to the read data, and generates scanning data.

The communicator 70 is a device for communicating with an external device (an external computer 90 in this example), and the controller 10 can send desired information to the computer 90 and receive instructions and information from the computer 90.

In this embodiment of the invention, when the conversion circuit 10*a* of the controller 10 produces scanning data, the controller 10 sends the scanning data through the communicator 70 to the computer 90. The scanning data may obviously be used in many ways, and may be stored on a recording medium not shown of the scanner 1, stored on a removable recording medium, or sent through the communicator 70 to a device other than the computer 90.

The scanner 1 according to this embodiment has both an automatic document feeder (ADF) not shown, and a scanning platen, and documents are scanned at the scanning position regardless of which is used. The scanner 1 according to this embodiment has a first reading unit, a second reading unit, and a third reading unit. The first reading unit can scan stationary documents that are placed on the scanning platen. The second reading unit can scan the front (first side) of moving documents conveyed by the ADF. The third reading unit can scan the the back side of moving documents.

The first reading unit includes, as shown in FIG. 1, a first sensor 21, a first light source 31, a sub-scanning device 41, and a first optical system 51. The sub-scanning device 41 is a device for moving the first sensor 21, first light source 31, and first optical system 51 bidirectionally in the sub-scanning direction.

The second reading unit includes, as shown in FIG. 1, a second sensor 22, a second light source 32, and a second optical system 52, and the third reading unit includes, as shown in FIG. 1, a third sensor 23, a third light source 33, and a third optical system 53. The second reading unit and third reading unit do not have a device equivalent to the sub-scanning device 41.

The second sensor 22, second light source 32, and second optical system 52, and the third sensor 23, third light source 33, and third optical system 53, are more specifically disposed to fixed positions in the scanner 1. Light from the second light source 32 is emitted to a specific position on the conveyance path of the moving document, and light from the moving document passes through the second optical system 52 and is sensed by the second sensor 22 to image the document. Likewise, light from the third light source 33 is emitted to a specific position on the conveyance path of the moving document, and light from the moving document passes through the third optical system 53 and is sensed by the third sensor 23 to image the document.

The first sensor 21, second sensor 22, and third sensor 23 comprise multiple sensor chips. Each sensor is therefore a sensor group. Each sensor chip forms a line sensor, which is a sensor extending in one direction, and comprises numerous photoelectric conversion elements arrayed in the one direction. In this embodiment, each sensor chip has photoelectric conversion elements arranged in three rows, and a red (R), green (G), and blue (B) color filter is respectively disposed to the photoelectric conversion elements in each row. In this embodiment of the invention, the direction in which the rows of photoelectric conversion elements extend is perpendicular to the sub-scanning direction (the conveyance direction of a moving document). The direction in which the photoelectric conversion elements are arrayed is referred to as the main scanning direction.

The multiple sensor chips of the first sensor 21 are disposed at a specific interval in the main scanning direction.

The multiple sensor chips of the second sensor 22 and third sensor 23 are disposed adjacently in the main scanning direction, and the interval between adjacent photoelectric conversion elements in different sensor chips is the same as the interval between photoelectric conversion elements in a sensor chip at a different position. In the second sensor 22 and third sensor 23, therefore, the multiple sensor chips are arrayed adjacently, and effectively form a line sensor for scanning one line in the main scanning direction.

The first light source 31, second light source 32, and third light source 33 each have a lamp that emits light to a scanning area (exposure position) in the conveyance path of the moving document. When a document is scanned as a stationary document, the exposure position moves in the sub-scanning direction. Light reflected from the object (a document or white calibration plate, for example) located at the exposure position is received by the sensor chips of the first sensor 21, second sensor 22, or third sensor 23, and the sensor chips generate signals corresponding to the amount of light received by each photoelectric conversion element.

The first sensor 21, second sensor 22, and third sensor 23 have an analog front end, not shown. The analog front end includes a circuit that applies gain to the signals output by the photoelectric conversion elements according to the amount of light received, and an analog/digital conversion (ADC) circuit. The analog front end in this example also has a recording medium for recording information indicating the gain, and the analog front end, based on the gain information, adjusts the gain of the black level of the first sensor 21, second sensor 22, and third sensor 23 to the lowest output value, and the white level to the highest output level.

Note that in this embodiment the first light source 31, second light source 32, and third light source 33 are light sources that output white light. Because the photoelectric conversion element arrays of the first sensor 21, second sensor 22, and third sensor 23 are equipped with RGB color filters, the first sensor 21 and second sensor 22 can generate RGB scanning data based on the light from a document exposed to white light.

The conveyance device 40 is a mechanism that conveys documents. The conveyance device 40 conveys the moving document to the positions exposed to light from the second light source 32 and the third light source 33, and then conveys the moving document out from the scanner 1.

Figure 2:
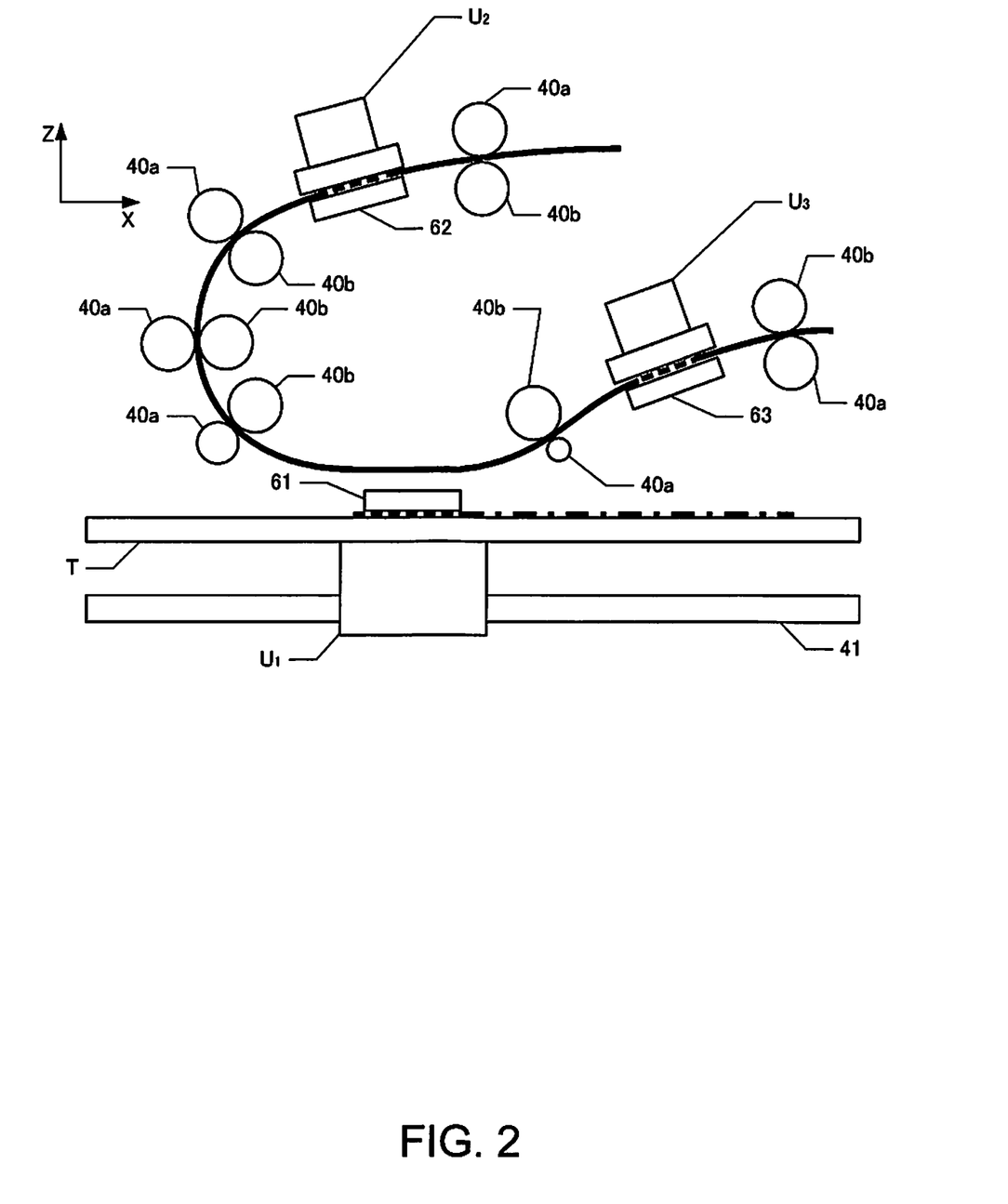
FIG. 2 illustrates the configuration around the conveyance mechanism of the scanner.

FIG. 2 schematically illustrates the conveyance path of the conveyance device 40. The conveyance path comprises plastic members not shown forming the path of the moving document, and a moving document is conveyed through the conveyance path by opposing conveyance rollers 40*a*, 40*b* disposed at multiple positions along the path. The conveyance path is indicated by the curve of the heavy solid line in FIG. 2. The exposure positions on the conveyance path are indicated by the dotted lines, and one line in the main scanning direction (direction perpendicular to the X-axis and Z-axis) is read at the exposure position by the first sensor 21, second sensor 22, and third sensor 23.

The first sensor 21, first light source 31, and first optical system 51 of the first reading unit are housed in a first unit U1 shown in FIG. 2, and a calibration plate 61 is disposed on the opposite side of the scanning platen T with the exposure position therebetween. In other words, the multiple sensor chips of the first sensor 21 are disposed separated a specific distance in the main scanning direction, and are configured to read one line by guiding light from the document on the scanning platen by multiple light paths to the multiple sensor chips.

Light from the area of one line on a document is therefore split into light from multiple areas of which the ends in the main scanning direction overlap, and each of the split light beams is focused on a sensor chip. More specifically, the first sensor 21 has a sensor for imaging light from the same part of a document on different sensor chips 21a.

As a result, in this embodiment of the invention, the output from the sensor chips of the first sensor 21 must be synthesized to generate one line of scanning data. A merging mark used as an index for synthesizing data is therefore formed on the calibration plate 61 in this embodiment of the invention.

The merging mark is formed at a position where areas overlap at the ends of adjacent areas, and by scanning the merging mark when a document is not on the platen, the photoelectric conversion elements that read the same position can be identified in the output of the sensor chips.

The calibration plate 61 includes a white calibration plate and a black calibration plate for gain adjustment, the white level is determined based on the result measured with the white calibration plate, and the black level is determined based on the result measured with the black calibration plate. Note that the calibration plate 61 may be configured with a moving part, and disposed so that the target selected from among the merging mark, white calibration plate, and black calibration plate is moved by the moving part and set to the exposure position.

Like calibration plate 61, calibration plates 62 and 63 also have a white calibration plate and a black calibration plate.

In FIG. 2, the sub-scanning device 41 is a device capable of moving the first unit U1 bidirectionally in the sub-scanning direction (X-axis).

When scanning a stationary document set on the scanning platen T (that is, when scanning on a flat bed), the sub-scanning device 41 moves the first sensor 21, first light source 31, and first optical system 51 in the sub-scanning direction to scan the document. In the case of a stationary document, therefore, the area indicated in FIG. 2 by the dotted line and the dot-dash line connected to the dotted line is the exposure position (the document scanning range), and the exposure position can move in the sub-scanning direction.

The second sensor 22, second light source 32, and second optical system 52 of the second reading unit are disposed in the second unit U2 shown in FIG. 2. The third sensor 23, third light source 33, and third optical system 53 of the third reading unit are disposed in the third unit U3 shown in FIG. 2.

When scanning a moving document, the front is read by the first unit U1, and the back is read by the third unit U3 when necessary. In this embodiment of the invention, the second reading unit (second unit U2) and the third reading unit (third unit U3) are a CIS (contact image sensor).

The first optical system 51 includes an optical member for reducing and converging an image of the document on the first sensor 21. More specifically, the first optical system 51 has a member forming a light path guiding, to the sensor chip, light from the document produced by the first light source 31 emitting light to the document. The light path may be configured in many ways, and can be configured from combinations of various members, including an aperture member, lenses, and mirrors.

Figure 3:
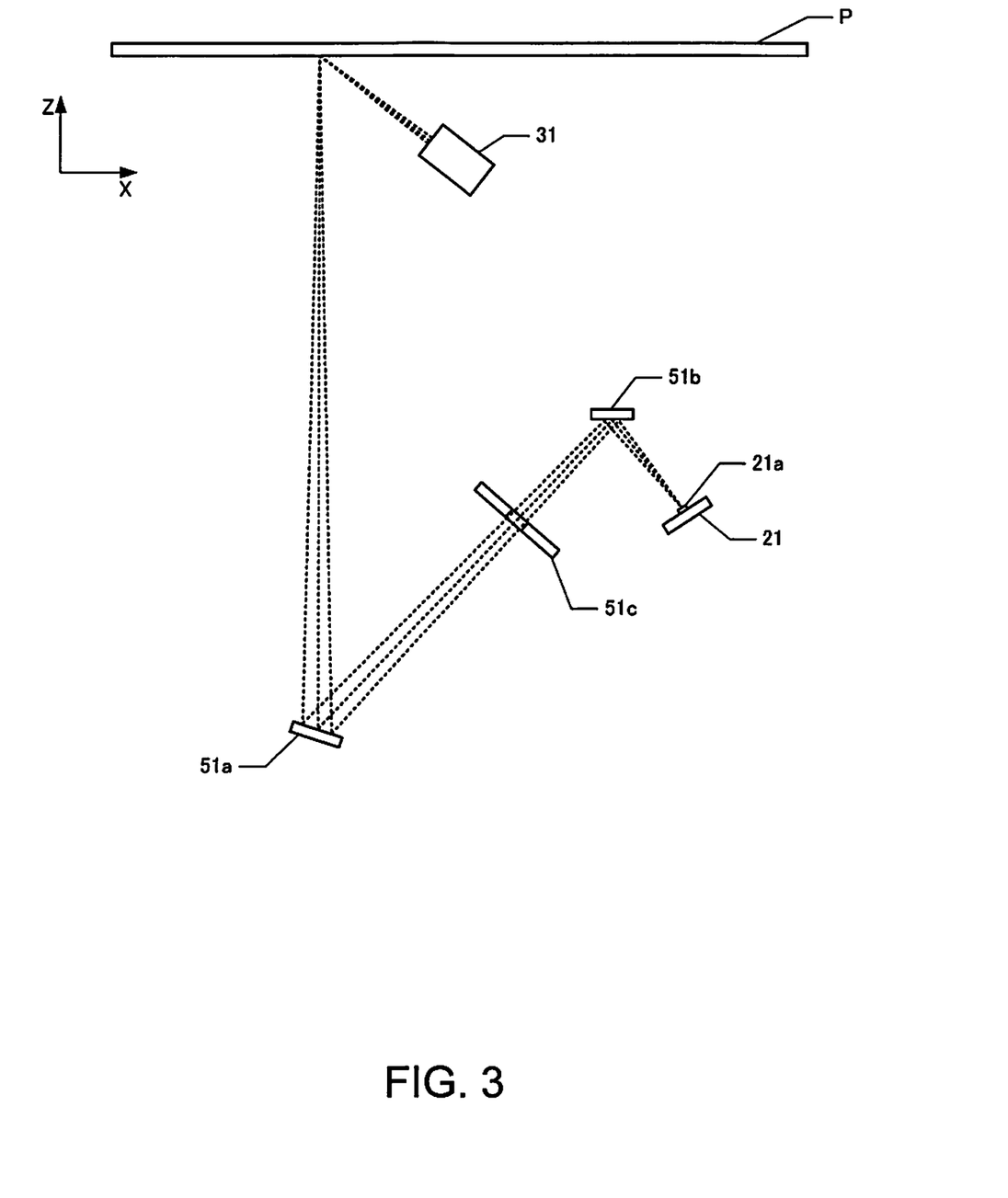
FIG. 3 illustrates the configuration of an optical system of the scanner.

FIG. 3 shows an example of an light path as viewed parallel to the main scanning direction. The configuration in FIG. 3 shows the first light source 31 that emits light to the document P, first optical system 51, and first sensor 21. The first optical system 51 uses a configuration that includes a first mirror 51a with multiple concave surfaces, a second mirror 51b with multiple concave surfaces, and an aperture member 51c having multiple openings that function as apertures; and guides the light to the sensor chip 21a by splitting the light from one line in the main scanning direction of the document P (the direction perpendicular to the X-axis and Z-axis) into multiple areas that overlap in part in the main scanning direction, and reducing the image of each area.

Figure 4:
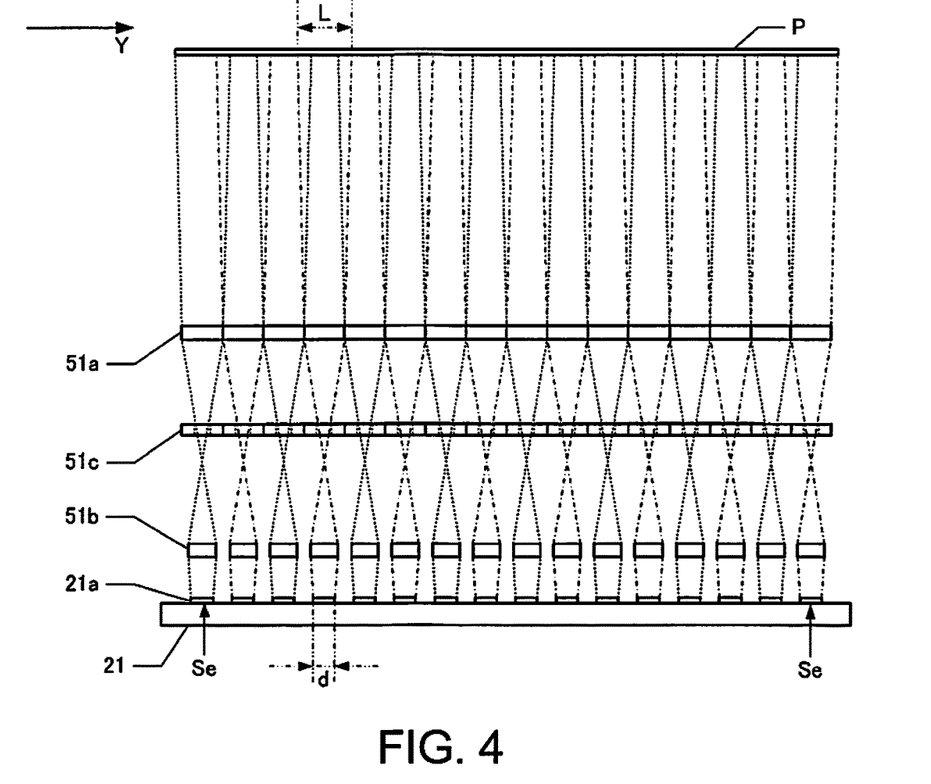
FIG. 4 schematically illustrates image reduction by the optical system.

FIG. 4 schematically illustrates the operation of the optical system with the main scanning direction on the horizontal axis. In FIG. 4, light from the document P passes the first optical system 51 and is guided to the sensor chip 21a, and the path of light from the document P is indicated schematically by the dotted lines and dot-dash lines. In other words, the sensor chip 21a extends in the main scanning direction (Y-axis), and images of adjacent parts of the document P that partially overlap in the main scanning direction are reduced in the parts of the first optical system 51 corresponding to those parts of the document P. The images from each area of the document P are then focused on the sensor chip 21a corresponding to those parts. More specifically, an image of the area of length L in the main scanning direction is focused on a sensor chip 21a of length d.

That one-to-one imaging optics that form images on the second sensor 22 and third sensor 23 without reducing the size are used in the second optical system 52 and the third optical system 53. The controller 10 therefore does not need to apply the synthesizing process to the output of the second sensor 22 and the third sensor 23, and executes image processing (such as cropping or edge enhancement) by the conversion circuits 10a, 10b to acquire the scanning data.

However, because the first sensor reads same positions on the document P multiple times, the controller 10 must synthesize data output from adjacent sensor chips where the outputs coincide to generate the scanning data. More specifically, the conversion circuit 10a of the controller 10, based on the read results of the merging mark formed on the calibration plate 61, superimposes the outputs of the sensor chips 21a. More specifically, as shown in FIG. 4, the first sensor 21 is embodied by multiple sensor chips 21a, and the multiple sensor chips 21a are disposed to different positions.

Figure 5:
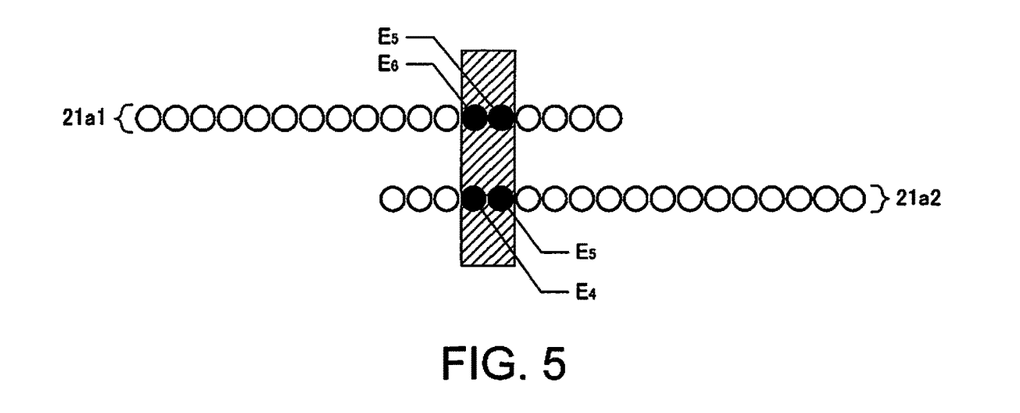
FIG. 5 describes data synthesis.

When the same positions are read by different sensor chips 21a, the same positions are read at the ends of the sensor chips 21a. Because these same positions are where the merging marks are disposed on the calibration plate 61, when the merging mark is read without a document present, each sensor chip 21a outputs data capturing the merging mark. FIG. 5

FIG. 5 schematically illustrates the photoelectric conversion elements of the sensor chip 21a, the black dots denoting the photoelectric conversion elements. In FIG. 5, the merging mark is a line extending in the sub-scanning direction, and the areas around the merging mark are white.

The merging mark is read by each pair of adjacent sensor chips 21a. In FIG. 5, the photoelectric conversion elements of the sensor chips 21a that read the merging mark are indicated by black dots, the merging mark is indicated by hatching, and the photoelectric conversion elements that read the merging mark are shown overlapping. One of the adjacent sensor chips 21a is located on the top left side, the other is located on the bottom right side, and the sensor chips 21a are shown schematically so that the photoelectric conversion elements that read the merging mark are vertically aligned. One of the two adjacent sensor chips 21a is referred to below as first sensor chip 21a1, and the other as second sensor chip 21a2.

The first sensor chip 21a1 and second sensor chip 21a2 output, as serial data, signals corresponding to the amount of light detected by the photoelectric conversion elements aligned in the main scanning direction. In this example, the controller 10 analyzes the output of the first sensor chip 21a1, and determines that the merging mark was detected by the fifth and sixth photoelectric conversion elements E5, E6 from the end. The controller 10 also analyzes the output of the second sensor chip 21a2, and determines that the merging mark was detected by the fourth and fifth photoelectric conversion elements E4, E5 from the end. In this case, the controller 10 determines that the fifth and sixth photoelectric conversion elements E5, E6 of the first sensor chip 21a1, and the fourth and fifth photoelectric conversion elements E4, E5 of the second sensor chip 21a2, read the same position, and in memory not shown stores the locations of the corresponding elements in each sensor chip 21a.

The controller 10 applies the above process sequentially from the end of the sensor chips 21a in the main scanning direction, and identifies the location of the photoelectric conversion elements that read the same position in each sensor chip 21a. Note that of the multiple sensor chips 21a embodying the first sensor 21, any of the sensor chips other than the sensor chips at the ends may be either a first sensor chip 21a1 or a second sensor chip 21a2.

For example, if one sensor chip 21a is the first sensor chip 21a1 and then becomes the adjacent second sensor chip 21a2 such that the second sensor chip 21a2 is treated as the first sensor chip 21a1, the sensor chip 21a adjacent thereto on the opposite side becomes the second sensor chip 21a2.

Once the locations of the photoelectric conversion elements reading the same position are determined as described above, the next time a document P is scanned, the controller 10 generates one line of scanning data by synthesizing the outputs of the sensor chips 21a based on their respective positions.

(2) Optical System Configuration

In the configuration described above, a segmented reduction optics system that reduces a document through multiple light paths and focuses on multiple sensor chips 21a is used for the first reading unit, and the second reading unit and third reading unit are a CIS that scans a document using multiple sensor chips and a 1:1 (same size) imaging optical system. As a result, different optical systems are used in the first reading unit, and the second reading unit and third reading unit.

Figure 6:
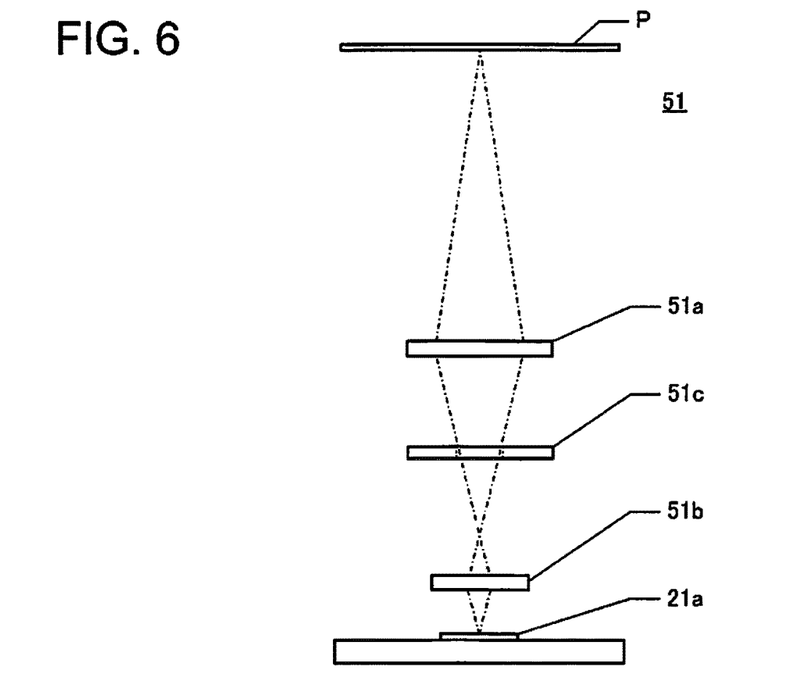
FIG. 6 illustrates the optical system of a first reading unit.
Figure 7:
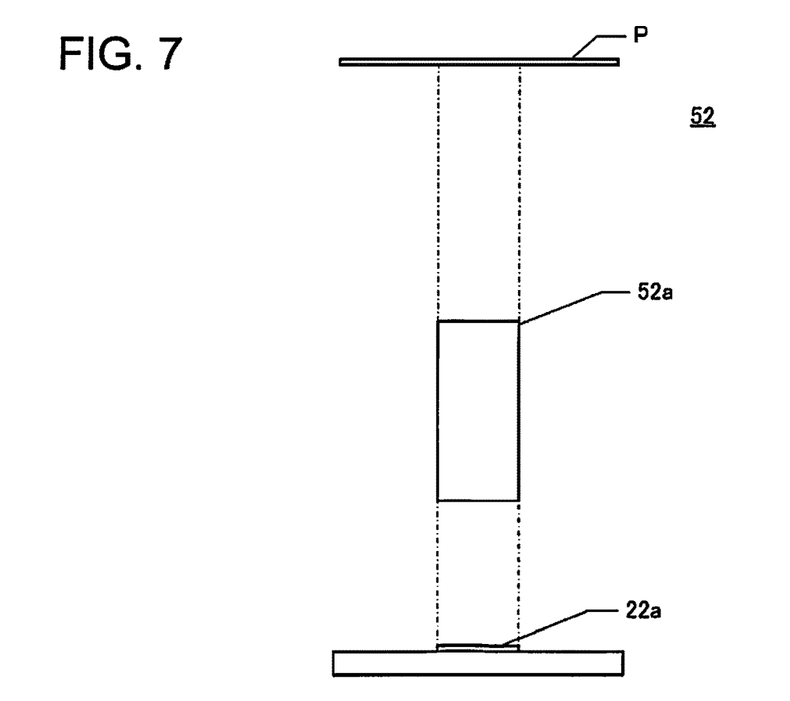
FIG. 7 illustrates the optical system of a second reading unit.

FIG. 6 illustrates the parts related to one light path in the first optical system 51 of the first reading unit. FIG. 7 schematically illustrates the optical system of the second reading unit and third reading unit, and schematically illustrates the parts related to one light path in the second optical system 52 of the second reading unit.

The second optical system 52 is a CIS, in this embodiment of the invention the multiple lenses 52a each have a rod lens and are arranged in the main scanning direction, and a same-size image of the document P is formed by the lenses 52a on the sensor chips 22a. In the configuration shown in FIG. 7, an aperture member having an aperture is disposed inside the lens 52a, but the aperture member may be disposed at a different position. The lens 52a may also function as the aperture member by preventing light from entering from any side other than the lens surface of the lens 52a.

While the reading units use different optical systems as described above, an f-number can generally be defined for an optical system forming a light path. In a complex optical system, the f-number can also be simulated supposing a lens forming a light path equivalent to the light path formed by the optical system. The f-number acquired by such simulation is called the equivalent f-number.

In this embodiment of the invention, the equivalent f-number of the first optical system 51 shown in FIG. 6 is 6 or greater, and the equivalent f-number of the second optical system 52 shown in FIG. 7 (and the third optical system 53) is approximately 2 to 3.

Figure 8:
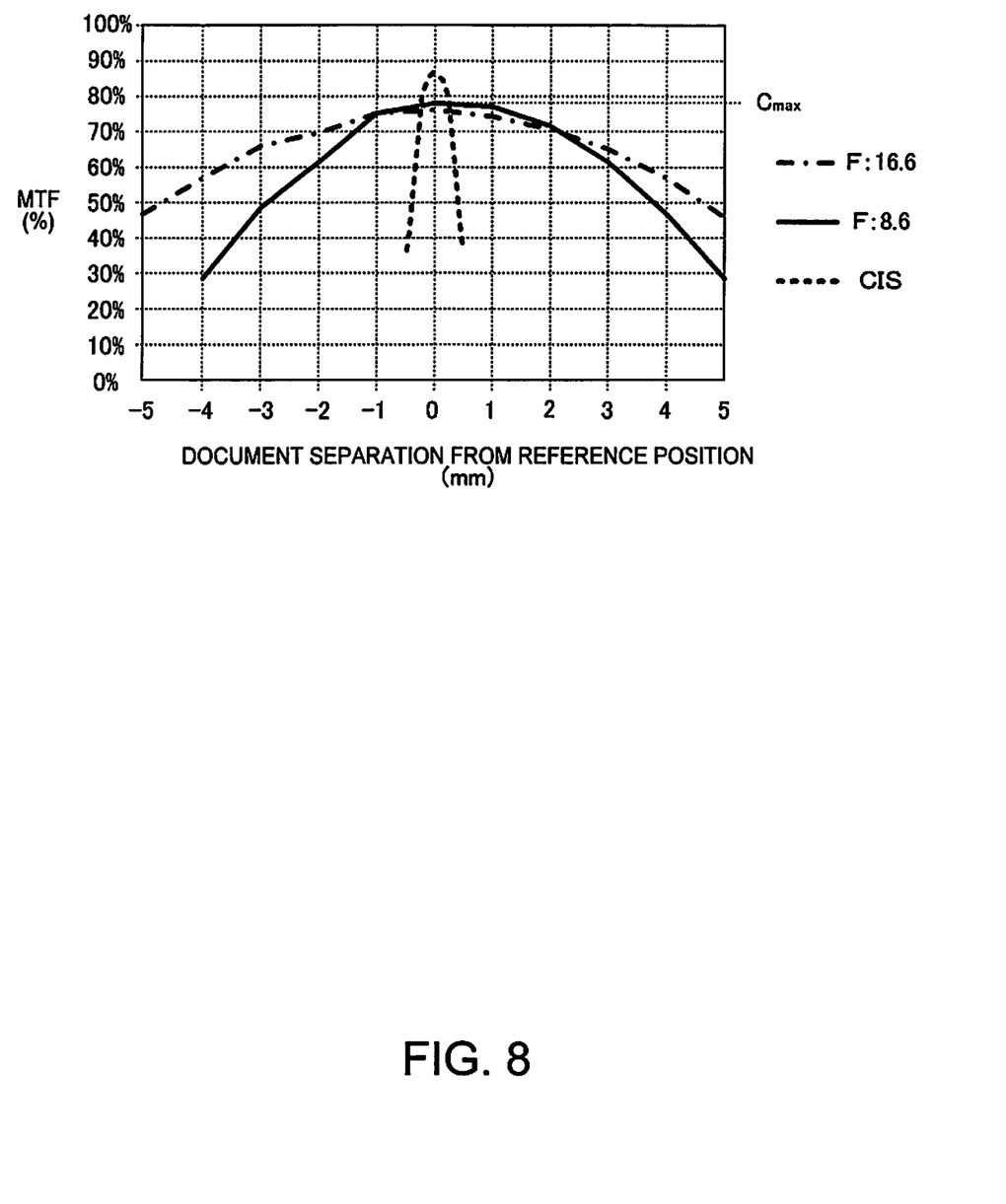
FIG. 8 is a graph showing the simulated results of the spatial frequency characteristic of the concave surface.

FIG. 8 shows the results of simulations of the spatial frequency characteristics acquired by scanning a document with the first reading unit. The path of light from a document P was simulated based on the shape and size of the actual members of a first optical system 51 configured as shown in FIG. 6, and a process acquiring the spatial frequency characteristics with varying amounts of separation of the document P from the platen glass (reference position) was executed. The graph shown in FIG. 8 was then created based on the spatial frequency characteristics (MTF: Modulation Transfer Function) acquired at the different amounts of separation.

FIG. 8 shows the simulated results of a configuration in which the equivalent f-number of the first optical system 51 is 8.6 and 16.6, the solid line based on data for an equivalent f-number of 8.6, and the dotted line based on data for an equivalent f-number of 16.6.

The dotted line in FIG. 8 indicates the spatial frequency of a CIS (such as the second reading unit) with a typical f-number of approximately 2 to 3. Compared with a CIS, the width of the spatial frequency distribution of the first reading unit using the first optical system 51 is greater, and the spatial frequency characteristic exceeds 50% over a wide range. Therefore, the first reading unit can suppress a drop in image quality due to separation of the document from the platen glass better than the second reading unit.

Note that because barcodes and QR codes (R) can be read if the spatial frequency characteristic exceeds 50%, tolerance for separation of the document from the reference position is poor at less than 1 mm with a CIS, but such symbols can be read by the first optical system 51 even if the document separates several millimeters from the reference position.

In this embodiment, a document placed on the platen glass is read by the first sensor 21, and a conveyed document is read by the second sensor 22 (and by the third sensor 23 in addition to the second sensor 22 in the case of duplex scanning). Documents that are placed on the platen glass, and documents that are conveyed, are therefore scanned by different sensors. With this configuration there is no need to configure a single sensor meeting all of the performance requirements necessary to scan documents under different scanning conditions, and allows for providing individual sensors meeting the performance requirements of different modes.

More specifically, in this embodiment, a white light source is used in the first optical system 51, second optical system 52, and third optical system 53, and each sensor chip has photoelectric conversion element arrays in three rows with corresponding R, G, and B filters. As a result, R, G, and B read results can be simultaneously acquired with the light supplied from the light source, and scanning is faster compared with a configuration that reads a document by sequentially supplying light from separate RGB light sources.

Faster scanning may be achieved by increasing the sub-scanning speed (increasing the speed the first reading unit moves in the sub-scanning direction, or increasing the conveyance speed of the document). However, because the exposure per unit time of the main scanning line decreases if the sub-scanning speed increases, the sub-scanning speed must be suppressed, or the intensity of the white light source increased, to assure the required exposure without modifying the optical system. However, increasing the intensity of the white light source increases the size of the reading unit. In addition, because heat is produced from the white light source, excessively increasing the intensity of the white light source requires providing a fan or heat sink to disperse the heat.

However, exposure can be adjusted not only by the sub-scanning speed and intensity of the white light source, but also by the aperture stop of the optical system. The equivalent f-number of the second optical system 52 and third optical system 53 in this embodiment is approximately 2-3, and the equivalent f-number of the first optical system 51 is 6 or greater. The second optical system 52 and third optical system 53 therefore have a wide aperture with a greater actual aperture area than the first optical system 51.

As a result, in this embodiment, the second optical system 52 and third optical system 53, each of which is a CIS, can achieve a relatively high sub-scanning speed without greatly increasing the intensity of the white light source. This means that a heat dissipation mechanism is also not needed, and the second optical system 52 and third optical system 53 can be provided by a small reading unit. For example, compared with a CIS using separate RGB light sources, faster reading can be achieved and a low cost CIS can be easily provided.

The first optical system 51 in this embodiment has an equivalent f-number of 6, and to scan at high speed with this f-number, such as to read at the same sub-scanning speed as the second optical system 52, requires significantly increasing the intensity of the white light source, increasing the size and cost of the first optical system 51. The sub-scanning speed of the first optical system 51 is therefore not excessively increased in this embodiment of the invention, and a configuration that scans at a slower sub-scanning speed than the second optical system 52 is used. This configuration can provide a first unit U1 of an equivalent size as a reduction optics system such as the first optical system that uses separate RGB light sources. This configuration enables reading with a white light source, and by not using or using a small fan or heat sink, the cost does not increase greatly.

As known from the literature, if the equivalent f-number increases, the depth of field increases, and if the equivalent f-number decreases, the depth of field decreases. Documents conveyed by the ADF are flat sheets of paper, but documents placed on the platen glass may be books and other three-dimensional objects, and a deeper depth of field is required to scan documents on the platen glass than documents conveyed by the ADF. Configuring the first optical system 51 that reads documents on the platen glass with an equivalent f-number of 6, and configuring the second optical system 52 and third optical system 53 that read documents conveyed by the ADF with a smaller equivalent f-number than the first optical system 51, such as 2-3, as described above is therefore preferable from the perspective of the depth of field.

Note that because the front of a document is read by both the first optical system 51 and second optical system 52, a configuration that eliminates the second reading unit by conveying moving documents past the reading position of the first optical system 51 is conceivable. However, to achieve high speed reading in a configuration omitting the second reading unit, the size of the first reading unit unavoidably increases, and cost increases accordingly.

The cost incurred by this size increase is greater than the combined cost of the first reading unit and the cost of the second reading unit in this embodiment of the invention. Therefore, while the first reading unit and second reading unit are both reading units for reading the front side of a document, the cost of a configuration having two reading units that read the front side is less than the cost of a configuration that uses only one reading unit to read the front side. More specifically, this embodiment of the invention enables absorbing the cost increase resulting from increasing the number of sensors, and suppressing the total cost.

As described above, in this embodiment of the invention both the first reading unit and second reading unit are used to reading the front side of documents. Therefore, the first reading unit and second reading unit are not used simultaneously. As a result, this embodiment of the invention is configured so that the output of the first sensor 21 is image processed by the same conversion circuit 10*a* that processes the output of the second sensor 22.

In other words, both the first sensor 21 and second sensor 22 are connected to the conversion circuit 10*a*, and both the output of the first sensor 21 and the output of the second sensor 22 are supplied to the conversion circuit 10*a*. The conversion circuit 10*a* includes circuits for buffering data output in line sequence from the first sensor 21 and second sensor 22 until a specific amount of data (such as one page) is accumulated, and then applying post processing such as cropping or edge enhancement.

More specifically, in this embodiment, both read data from the first sensor 21 and read data from the second sensor 22 are converted by the conversion circuit 10*a*. However, because output from the first sensor 21 must be synthesized, when a document is read by the first sensor 21, the conversion circuit 10*a* applies cropping or other image conversion after synthesizing the read data from the first sensor 21. When image processing is applied, the conversion circuit 10*a* generates one file of scanning data based on the converted data, and outputs to the communicator 70. This configuration can suppress cost compared with a configuration that provides separate conversion circuits for the first sensor 21 and the second sensor 22.

Furthermore, in this embodiment, the third sensor 23 is connected to the conversion circuit 10*b*, and read data from the third sensor 23 is converted by the conversion circuit 10*b*. The conversion circuit 10*b* can apply the same image conversion processes as the conversion circuit 10*a*, but because the third sensor 23 is used to read the back side and is used in conjunction with the second sensor 22, this embodiment is configured to enable parallel processing by the conversion circuits 10*a*, 10*b*. As a result, high speed image conversion is possible even with duplex scanning using an ADF.

The scanning process in this embodiment of the invention is described next with reference to the flow chart in FIG. 9.

Figure 9:
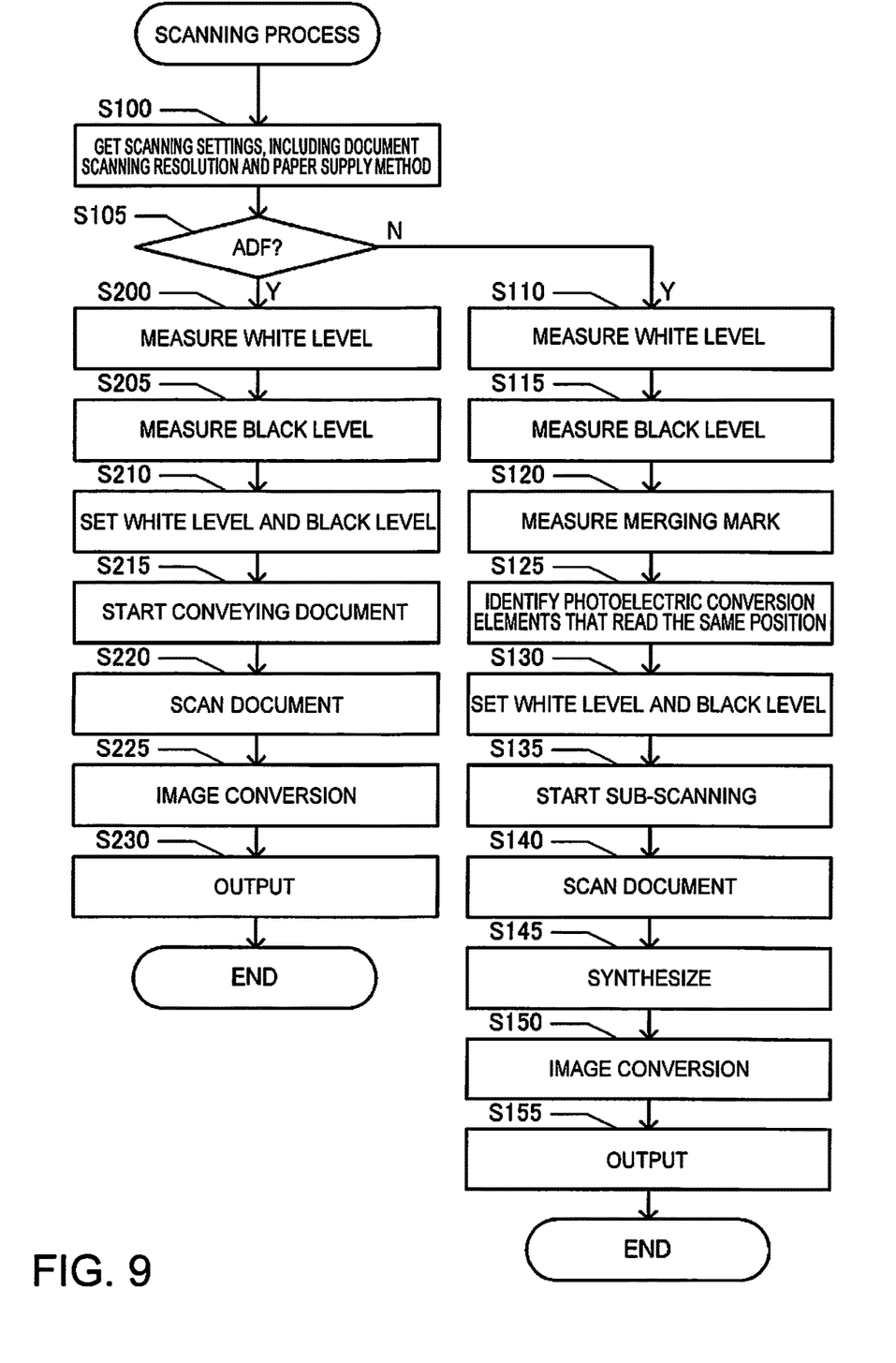
FIG. 9 is a flow chart of the scanning process.

When the user directly or indirectly selects the document scanning resolution and paper feed method (ADF or document platen), and commands scanning to start, the controller 10 receives the scan command and starts the scanning process shown in FIG. 9. When the scanning process starts, the controller 10 gets the scanning settings, including the document scanning resolution and the paper feed method (step S100). Note that in this example the user can select and set the desired resolution from among the plural document scanning resolutions that can be set for reading light reflected from a moving document.

Next, the controller 10 determines if the paper supply method is by ADF or not (step S105). More specifically, the controller 10 references the scanning settings acquired in step S100 to determine if the paper supply method is by ADF or using the scanning platen. If the controller 10 determines in step S105 that the paper supply method is not by ADF, that is, that a document on the document platen is to be scanned, the controller 10 measures image shading.

More specifically, the lowest level of light detectable by the sensor chip is the black level, and the highest level of detectable light is the white level, but the black level and white level can vary according to the sensor, light source, and other characteristics. For example, sensor characteristics may vary due to noise such as dark current, sensor manufacturing errors, and aging, and the black level and white level can vary according to such variations. Therefore, to scan with high quality, imaging shading is preferably measured before reading a document to determine at least one of the black level and white level.

The controller 10 in this example first measures the white level (step S110). More specifically, before reading the document, the controller 10 controls the first reading unit to read the white calibration plate of the calibration plate 61. As a result, because output indicating the measurement acquired by the first sensor 21 from the white calibration plate is acquired, the controller 10 acquires the output as the white level.

Next, the controller 10 measures the black level (step S115). More specifically, before reading the document, the controller 10 controls the first reading unit to read the black calibration plate of the calibration plate 61. As a result, because output indicating the measurement acquired by the first sensor 21 from the black calibration plate is acquired, the controller 10 acquires the output as the black level.

Next, the controller 10 measures the merging mark (step S120). More specifically, before scanning the document, the controller 10 controls the first reading unit to scan the merging mark of the calibration plate 61. As a result, the results of scanning the merging mark are output from the multiple sensor chips of the first sensor 21.

Next, the controller 10 identifies the photoelectric conversion elements that read the same position (step S125). For example, using the example in FIG. 5, the controller 10 identifies photoelectric conversion elements E5, E6 of the first sensor chip 21a1, and photoelectric conversion elements E4, E5 of second sensor chip 21a2, as the photoelectric conversion elements that read the same position. The controller 10 executes the same process for each sensor chip 21a, and identifies the photoelectric conversion elements in each sensor chip that read the same position.

Next, the controller 10 sets the black level and white level (step S130). That is, the controller 10, based on the white level measured in step S110 and black level measured in step S115, sets the white level and black level for each photoelectric conversion element. More specifically, based on the white level measured in step S110 and black level measured in step S115, the control unit 13 sets the gain to enable measuring gradations between the white level and black level in the effective detection range.

Next, the controller 10 starts sub-scanning (step S135). More specifically, the controller 10 outputs a control signal to the sub-scanning device 41 to move the first sensor 21, first light source 31, and first optical system 51 in the sub-scanning direction.

The controller 10 reads the document during the sub-scanning operation (step S140). More specifically, the controller 10 controls the first sensor 21 to read, acquires and digitalizes the read results from each sensor chip 21a of the first sensor 21, and adjusts the gain according to the white level and black level set in step S130.

Next, the controller 10 synthesizes the outputs from the sensor chips 21a (step S145). More specifically, the controller 10 synthesizes the outputs so that the photoelectric conversion elements identified in step S120 output one pixel. This synthesis is applied sequentially to the line by line results read in step S140. Next, the conversion circuit 10a of the controller 10 executes the image conversion process (step S150). More specifically, when one page of data synthesized in step S145 is accumulated, the conversion circuit 10a of the controller 10 applies post processing to convert value and color, crop the document, enhance edges, and other image conversion processes, and generates one page of scanning data. These processes may be applied sequentially to the line, or in a batch after all read results are acquired.

Next, the controller 10 outputs the scanning data (step S155). More specifically, the conversion circuit 10a of the controller 10 sends the scanning data converted in step S150 as one file of data through the communicator 70 to the computer 90.

The controller 10 also first measures shading when the paper supply method is determined in step S105 to be ADF. As a result, the controller 10 measures the white level (step S200). More specifically, before reading the document, the controller 10 controls the second reading unit to read the white calibration plate of the calibration plate 62. As a result, because output indicating the measurement acquired by the second sensor 22 from the white calibration plate is acquired, the controller 10 acquires the output as the white level of the second sensor 22.

If the back side is also read, the controller 10 also controls the third reading unit to read the white calibration plate of the calibration plate 63. As a result, because output indicating the measurement acquired by the third sensor 23 from the white calibration plate is acquired, the controller 10 acquires the output as the white level of the third sensor 23.

Next, the controller 10 measures the black level (step S205). More specifically, before reading the document, the controller 10 controls the second reading unit to read the black calibration plate of the calibration plate 62. As a result, because output indicating the measurement acquired by the second sensor 22 from the black calibration plate is acquired, the controller 10 acquires the output as the black level of the second sensor 22.

If the back side is also read, the controller 10 also controls the third reading unit to read the black calibration plate of the calibration plate 63. As a result, because output indicating the measurement acquired by the third sensor 23 from the black calibration plate is acquired, the controller 10 acquires the output as the black level of the third sensor 23.

Next, the controller 10 sets the black level and white level (step S210). That is, the controller 10, based on the white level measured in step S200 and black level measured in step S205, sets the white level and black level for each photoelectric conversion element. More specifically, based on the white level measured in step S2000 and black level measured in step S205, the control unit 13 sets the gain to enable measuring gradations between the white level and black level in the effective detection range.

Next, the controller 10 starts conveying the document (step S215). More specifically, the controller 10 outputs a control signal to the conveyance device 40 convey the document through the conveyance path.

While the document is being conveyed, the controller 10 reads the document (step S220). More specifically, the controller 10 controls the second sensor 22 to read, acquires and digitalizes the read results from each sensor chip of the second sensor 22, and adjusts the gain according to the white level and black level set in step S210.

Note that if duplex scanning is selected in step S100, the controller 10 also controls the third sensor 23 to read, and acquires the read results from the third sensor 23.

Next, the conversion circuit 10a of the controller 10 executes the image conversion process (step S225). More specifically, when one page of data output from the second sensor 22 is accumulated, the conversion circuit 10a of the controller 10 applies post processing to convert value and color, crop the document, enhance edges, and other image conversion processes, and generates one page of scanning data.

If duplex scanning was selected in step S100, the conversion circuit 10b of the controller 10, when one page of data output from the third sensor 23 is accumulated, applies post processing to convert value and color, crop the document, enhance edges, and other image conversion processes, and generates one page of scanning data.

These processes may be applied sequentially to the line, or in a batch after all read results are acquired.

Next, the controller 10 outputs the scanning data (step S230). More specifically, when conveyance and scanning all documents set in the ADF are completed, the conversion circuit 10a of the controller 10 compiles the scanning data for all pages processed in step S225 as one file of data, and outputs the scanning data through the communicator 70 to the computer 90.

Note that if duplex scanning was selected in step S100, the data processed by the conversion circuit 10b is also output to the conversion circuit 10a. In this case, the conversion circuit 10a sorts the scanning data for all pages (to arrange the scanning data for the front and back sides in the order the documents were read, for example). The conversion circuit 10a then compiles the sorted data into one data file, and sends the scanning data through the communicator 70 to the computer 90.

(4) Other Embodiments

The invention is described with reference to desirable embodiments above, but the invention is not so limited and can be varied in many ways. For example, the scanner described above may be a component of a multifunction device, which is an electronic device that is also used for other purposes.

The merging mark may also be configured in many ways, and may be two lines or graphic of another shape. During synthesis, images may also be synthesized to eliminate deviation (such as skewing) of the sensor chips in the sub-scanning direction.

To superimpose the outputs of photoelectric conversion elements that read the same part of the document, a statistical value (such as the average) of scanning data from one sensor chip and scanning data from the other sensor chip may be acquired and used, or the scanning data from one of the sensor chips may be used.

Scanning data generated by scanning may be output to a computer 90, output and stored to a storage medium such as USB memory installed to the device, output to a print mechanism and printed (or copied), or output and displayed on a monitor.

Alternatively, the final scanning data may be generated by outputting an area detection image to a computer 90, and applying image analysis and synthesis by a driver program or application program of the computer 90. In this configuration, the computer 90 may be considered part of the scanner.

The first sensor may be configured to in any form capable of reading a document on a platen glass. More specifically, the first sensor may be configured in any way enabling scanning a document on a flat bed.

The first sensor may be configured in any form enabling reading a document, and may include various members required to read. For example, the first sensor may include an optical system. Various configurations may be used for the optical system, but in this embodiment is a reduction type optical system forming a reduced size image of a specific range of a document (a line in the main scanning direction, for example) on a sensor having a range shorter than the length of the specific range.

Therefore, the sum of the length in the main scanning direction of the photoelectric conversion elements of the multiple sensor chips is shorter than the length of the scanning area in the main scanning direction of the document. Various members may be disposed to the light path, including mirrors or lenses with a concavity, and an aperture stop.

Note that as described above, the first sensor is not limited to a configuration having an optical system that guides light from a document on a platen glass through multiple optical paths to multiple sensor chips, and may be a reduction imaging system having a single optical path, or a configuration that forms a reduced image on a single sensor chip.

In a configuration in which the first sensor includes multiple sensor chips, and images light from the same part of the document on different sensor chips, the areas of the document may be variously arranged. In a configuration in which lines in the main scanning direction are read repeatedly, for example, one example is a configuration in which adjacent areas in the main scanning direction of a document on the document platen overlap in part, and light from each adjacent area is converged through a corresponding optical path on different sensor chips.

The second sensor may be configured in any form enabling reading a first side of a document being conveyed, and the third sensor may be configured in any form enabling reading a the second side, which is the opposite side as the first side, of the document being conveyed. More specifically, the second sensor and third sensor may be configured in any form enabling reading the front and back sides of a document conveyed by an automatic document feeder.

The second sensor and third sensor may also include various members required to read, and may include an optical system. Various configurations may be used for the optical system, but in this embodiment is a same-size optical system forming an image of a specific range of a document (a line in the main scanning direction, for example) on a sensor having a range equal to the length of the specific range.

Various members disposed to the optical path, including concave mirrors or lenses, and an aperture stop. Note that the second sensor and third sensory may have one or multiple sensor chips.

The second sensor and third sensor may also be configurations for reading a document with more intense light than the first sensor 21. More specifically, when scanning documents on the platen glass, the document to be scanned is typically placed on the platen glass each time the document is scanned, and there is no great need for high speed scanning. As a result, compared with the second sensor and third sensor used to scan moving documents, the first sensor 21 that scans documents placed on the platen glass typically allows for a relatively slow scanning speed using relatively weak light.

Therefore, a configuration in which the intensity of the light output from the first light source 31 is weaker than the intensity of the light output of the second light source 32 and third light source 33, and the second sensor 22 and third sensor 23 read documents with stronger light than the first sensor 21, may be used. This configuration eliminates the need to dissipate heat from the light source of the first sensor 21, prevents increasing the size of the scanning module, and can suppress cost. This also relates to reducing the size and weight of the carriage used to carry and move the first light source 31, and increases the cost reduction effect.

In this embodiment of the invention the output of the first sensor 21 and second sensor 22 is processed by the conversion circuit 10*a*, and the output of the third sensor 23 is processed by a different conversion circuit 10*b*, but other configurations may be used instead. For example, configurations that process the output from the first sensor 21, second sensor 22, and third sensor 23 by the conversion circuit 10*a* and omit the conversion circuit 10*b*, and configurations that process the output of the first sensor 21 and second sensor 22 by different conversion circuits, are conceivable.

The reading methods of the first sensor 21, second sensor 22, and third sensor 23 are also not limited to the methods described above. For example, all may read using a reduction optics system, and all may read using a same-size imaging system. In any case, a more desirable product can be achieved by configuring the sensors with characteristics appropriate to where they are installed and used with consideration for factors including, among others, image quality and heat dissipation.

Furthermore, an example in which the optical axis is straight is described above for simplicity, but by adding mirrors to the first optical system and the second optical system to fold the light path appropriately, the overall size of the optical system may be reduced.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. A scanner comprising:
a first sensor configured to read a first document when the first document is placed on a platen glass and to form an image of the first document;
a second sensor configured to read a first side of a moving second document, which is different from the first document, when the second document is conveyed along a conveyance path, and to form an image of the first side of the second document;
a third sensor configured to read a second side, which is the opposite side as the first side, of the second document when the second document is conveyed along the conveyance path, and to form an image of the second side of the second document; and
a controller configured to control an operation of the first sensor for scanning the first document and operations of the second sensor and the third sensor for scanning the second document.

2. The scanner described in claim 1, wherein:
the first sensor forms a reduced size image of the document; and
the second sensor and third sensor image form a same-size image of light from the document.

3. The scanner described in claim 2, wherein:
the first sensor has a plurality of sensor chips, and images light from a same part of a document on different sensor chips.

4. The scanner described in claim 1, further comprising:
a first light source configured to emit light to a document on the platen glass;
a second light sources configured to emit light to the first side of the conveyed document; and
a third light sources configured to emit light to the second side of the conveyed document;
the first light source and the third light source emitting to the document stronger light than the first light source.

5. The scanner described in claim 1, wherein:
output of the first sensor, and output of the second sensor, are image converted by the same conversion circuit.

6. A method of generating scanning data comprising:
reading a first document when the first document is placed on a platen glass and forming an image of the first document by a first sensor of a scanner;
reading a first side of a second document, which is different from the first document, when the second document is conveyed along a conveyance path, and forming an image of the first side of the second document by a second sensor of the scanner;
reading a second side, which is the opposite side as the first side, of the second document when the second document is conveyed along the conveyance path, and forming an image of the second side of the second document by a third sensor of the scanner;
generating scanning data as a result of reading by at least one of the first sensor, the second sensor, and the third sensor; and
controlling an operation of the first sensor for scanning the first document and operations of the second sensor and the third sensor for scanning the second document.

* * * * *